US012658619B2

(12) United States Patent
Dai et al.

(10) Patent No.: US 12,658,619 B2
(45) Date of Patent: Jun. 16, 2026

(54) TERMINAL CONNECTION STRUCTURE

(71) Applicant: Phoenix Contact Asia-Pacific (Nanjing) CO., LTD., Nanjing (CN)

(72) Inventors: Haiqiong Dai, Nanjing (CN); Huawei Song, Nanjing (CN); Degang Sun, Nanjing (CN)

(73) Assignee: Phoenix Contact Asia-Pacific (Nanjing) Co., Ltd., Nanjing (CN)

( * ) Notice: Subject to any disclaimer, the term of this patent is extended or adjusted under 35 U.S.C. 154(b) by 305 days.

(21) Appl. No.: 18/559,260

(22) PCT Filed: Apr. 29, 2022

(86) PCT No.: PCT/CN2022/090290

§ 371 (c)(1),
(2) Date: Nov. 6, 2023

(87) PCT Pub. No.: WO2022/233273

PCT Pub. Date: Nov. 10, 2022

(65) Prior Publication Data

US 2024/0243532 A1 Jul. 18, 2024

(30) Foreign Application Priority Data

May 6, 2021 (CN) ......................... 202110490995.4

(51) Int. Cl.
*H01R 12/71* (2011.01)
*H01R 12/58* (2011.01)
(Continued)

(52) U.S. Cl.
CPC ........... *H01R 12/716* (2013.01); *H01R 12/58* (2013.01); *H01R 13/502* (2013.01); *H01R 13/74* (2013.01); *H01R 13/746* (2013.01); *H01R 12/707* (2013.01)

(58) Field of Classification Search
CPC .... H01R 13/187; H01R 13/502; H01R 13/74; H01R 13/746; H01R 12/716; H01R 12/58; H01R 12/707
(Continued)

(56) References Cited

U.S. PATENT DOCUMENTS 3,270,251 A 8/1966 Evans
4,553,322 A 11/1985 Cappos et al.
(Continued)

FOREIGN PATENT DOCUMENTS

CN 2610511 Y 4/2004
CN 103022757 A 4/2013
(Continued)

OTHER PUBLICATIONS

State Intellectual Property Office, Chinese Office Action—First Office Action—for Chinese Patent Application No. 202210474555.4, issued Nov. 29, 2024, 20pp.
(Continued)

*Primary Examiner* — Gary F Paumen
(74) *Attorney, Agent, or Firm* — The Roy Gross Law Firm, LLC; Roy D. Gross

(57) ABSTRACT

The present disclosure provides a terminal connection structure, comprising: an insulating housing to be mounted to a panel, the insulating housing having a through terminal channel; a primary terminal structure disposed in the terminal channel, the primary terminal structure is to establish an electrical connection running through the terminal channel; and a soldering terminal, one end of the soldering terminal is to be soldered to a circuit board spaced apart from the panel, and the other end of the soldering terminal is to be plugged into the primary terminal structure, wherein one end of the primary terminal structure comprises a first elastic
(Continued)

coupling member for establishing a slidable electrical connection with the soldering terminal.

9 Claims, 12 Drawing Sheets

(51) Int. Cl.
*H01R 12/70* (2011.01)
*H01R 13/502* (2006.01)
*H01R 13/74* (2006.01)

(58) Field of Classification Search
USPC .................................................. 439/551, 843
See application file for complete search history.

(56) References Cited

U.S. PATENT DOCUMENTS

| | | | | |
|---|---|---|---|---|
| 5,591,039 | A | 1/1997 | Matthews | |
| 7,841,906 | B2 * | 11/2010 | Dent | H01R 13/187 439/675 |
| 8,029,326 | B2 * | 10/2011 | Rossman | H01R 13/187 439/843 |
| 8,142,238 | B2 * | 3/2012 | Heigl | H01R 13/187 439/843 |
| 8,734,167 | B2 * | 5/2014 | Aimoto | H01R 12/91 439/74 |
| 8,888,537 | B2 * | 11/2014 | Do | H01R 13/5202 439/668 |
| 2009/0275233 | A1 | 11/2009 | Zhang et al. | |
| 2014/0357137 | A1 * | 12/2014 | Sian | H01R 13/187 439/843 |
| 2015/0024641 | A1 * | 1/2015 | Lascelles | H01R 13/187 29/857 |

FOREIGN PATENT DOCUMENTS

| | | | |
|---|---|---|---|
| CN | 103066462 | A | 4/2013 |
| CN | 202977789 | U | 6/2013 |
| CN | 203423290 | U | 2/2014 |
| CN | 103840286 | A | 6/2014 |
| CN | 106654727 | A | 5/2017 |
| CN | 207967371 | U | 10/2018 |
| CN | 210897709 | U | 6/2020 |
| CN | 212462109 | U | 2/2021 |
| CN | 212968141 | U | 4/2021 |
| CN | 113193397 | A | 7/2021 |
| DE | 102014211092 | A1 | 12/2015 |
| EP | 3389144 | A1 | 10/2018 |
| JP | H0831488 | A | 2/1996 |
| WO | 2020233399 | A1 | 11/2020 |

OTHER PUBLICATIONS

International Search Report and Written Opinion of International Application No. PCT/CN2022/090290, dated Jun. 10, 2022, 10 Pages.

* cited by examiner

TERMINAL CONNECTION STRUCTURE

This application is a national stage application under 35 U.S.C. § 371 of International Application No. PCT/CN2022/090290, filed Apr. 29, 2022, which claims priority to Chinese Patent Application No. 202110490995.4, filed May 6, 2021. The entire contents of each of Application Nos. PCT/CN2022/090290 and CN 202110490995.4 are incorporated herein by reference.

TECHNICAL FIELD

The present disclosure relates to a terminal connection structure. Such terminal connection structure can establish an electrical connection between an external circuit and a PCB within an electrical device, and accommodate different spacing between the PCB within the device and a casing panel of the device.

BACKGROUND

The terminals inside an electrical device may be connected to the outside through connectors mounted to a panel of the device. As the number of the internal terminals of the device increases, the number of the wire harnesses for wiring increases correspondingly, causing inconvenience in assembly and use. One solution is to use PCBs in the electrical device. A variety of the internal terminals of the device are to be connected to the PCBs and lead-out terminals are to be soldered on the PCBs, and then an electrical connection would be established between the lead-out terminals and the connectors mounted to the mounting panel of the device case.

The above connecting method has been applied to a photovoltaic inverter device of a photovoltaic system. FIGS. 10A-10C illustrate such a connecting schema, where a mounting panel 1010 of the device is provided with a plurality of mounting holes therein, for the insertion of connectors 1030 which are suitable for panel mounting. A PCB 1020 is positioned behind the mounting panel 1010. Lead-out terminals (not shown) may be provided on the PCB 1020 by soldering. The lead-out terminals are inserted into the connectors 1030 mounted to the panel, to establish the electrical connection. In practice, however, due to the large tolerance range of the spacing between the mounting panel of the case of the photovoltaic inverter and the PCB in the device, the solder joint of the lead-out terminals on the PCB would be subjected to pulling force if the actual spacing is too large after connecting the lead-out terminals to conductive components in the connectors mounted to the panel.

Therefore, it is desired to provide a novel terminal connection structure suitable for panel mounting to eliminate the above problem.

SUMMARY

The present disclosure is intended to provide a novel terminal connection structure suitable for panel mounting. The terminal connection structure can effectively realize a flexible connection between a mounting panel of an electrical device and a PCB in the device with a low cost.

According to one aspect of the present disclosure, a terminal connection structure is provided, comprising: an insulating housing to be mounted to a panel, the insulating housing having a through terminal channel; a primary terminal structure disposed in the terminal channel, the primary terminal structure is to establish an electrical connection running through the terminal channel; and a soldering terminal, one end of the soldering terminal being is to be soldered to a circuit board spaced apart from the panel, and the other end of the soldering terminal is to be plugged into the primary terminal structure, wherein one end of the primary terminal structure comprises a first elastic coupling member (5) for establishing a slidable electrical connection with the soldering terminal.

Further, in the aforesaid terminal connection structure, the other end of the primary terminal structure comprises a second elastic coupling member (20) for establishing a slidable electrical connection with an insertion terminal in a mating connector.

Further, in the aforesaid terminal connection structure, the first elastic coupling member is a first crown spring.

Further, in the aforesaid terminal connection structure, the first elastic coupling member is a first crown spring, and the second elastic coupling member is a second crown spring.

Further, in the aforesaid terminal connection structure, the primary terminal structure comprises a conductive sleeve, and the first crown spring is to establish an electrical connection with an inner wall of the conductive sleeve, and is to establish a slidable electrical connection with an insertion body of the soldering terminal inserted into the sleeve.

Further, in the aforesaid terminal connection structure, the primary terminal structure comprises a conductive sleeve, and the soldering terminal comprises a soldering tail end at one end and a insertion body at the other end; the first crown spring is to establish an electrical connection with an inner wall of the conductive sleeve and to establish a slidable electrical connection with the insertion body of the soldering terminal inserted into the sleeve, and the second crown spring is to establish an electrical connection with the inner wall of the conductive sleeve and to establish a slidable electrical connection with the insertion terminal in the mating connector.

Further, in the aforesaid terminal connection structure, the panel is a casing panel of an electrical device, and the circuit board is a PCB positioned at an inner side of the panel of the electrical device and spaced apart from the panel of the electrical device.

Further, in the aforesaid terminal connection structure, the structure further comprises a cover configured for mating installation with a soldering terminal insertion end of the insulating housing, wherein the soldering terminal is configured to be applicable for insertion and being positioned in the cover.

Further, in the aforesaid terminal connection structure, the first elastic coupling member is one of a crown spring, a torsion spring, a wire spring, a claw, or a leaf spring.

Further, in the aforesaid terminal connection structure, the second elastic coupling member is one of a crown spring, a torsion spring, a wire spring, a claw, or a leaf spring.

The benefit effects achieved by the present disclosure include at least:

By using elastic coupling member(s) such as crown springs in the primary terminal structure within the insulating housing for panel mounting, the lead-out/soldering terminal of the PCB is enabled to establish reliable and slidable electrical connections with the primary terminal structure at different insertion depths. Such structure accommodates different spacings between the mounting panel of the device and the PCB inside the device, thereby achieving an axial flexible connection between the soldering terminal of the PCB and the primary terminal structure in the insulating housing, and allowing for a larger tolerance.

DETAILED DESCRIPTION

Figure 1A:
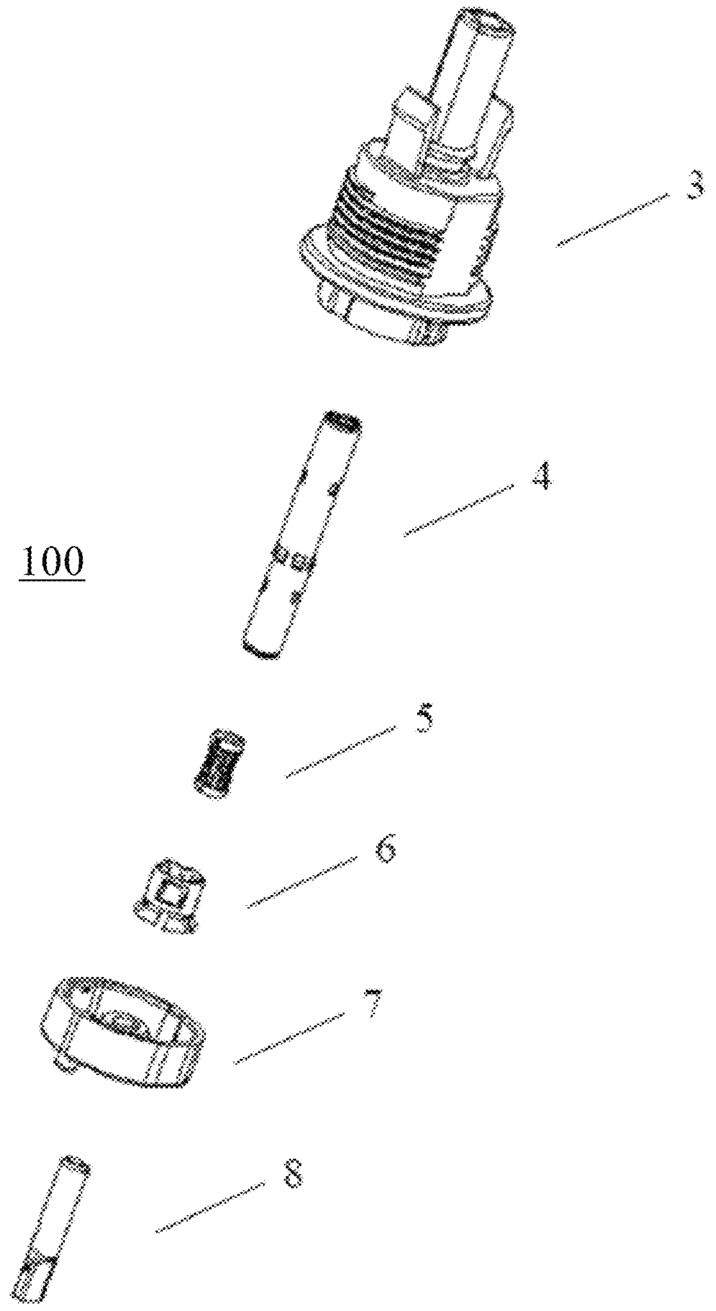
FIG. 1A and FIG. 1B illustrate schematic exploded views of a terminal connection structure according to an example of the present disclosure.

In the following description, the present disclosure is described with reference to various examples. However, one skilled in the art will recognize that the various examples may be practiced without one or more of the specific details or with other alternative and/or additional methods, materials, or components. In other instances, well-known structures, materials, or operations have not been illustrated or described in detail so as not to obscure aspects of the various examples of the present disclosure. Likewise, for purposes of explanation, specific quantities, materials, and configurations are set forth in order to provide a thorough understanding of the examples of the present disclosure. However, the present disclosure may be practiced without the specific details. In addition, it should be understood that the examples shown in the drawings are illustrative representations and are not necessarily drawn to scale.

FIG. 1A shows a schematic exploded view of a terminal connection structure 100 for panel mounting according to an example of the present disclosure. As shown in FIG. 1A, the terminal connection structure 100 may comprise an insulating housing 3, a conductive sleeve 4, a crown spring 5, a retaining ring 6, a cover 7, and a soldering terminal 8, wherein the insulating housing 3, the conductive sleeve 4, the crown spring 5, and the retaining ring 6 may be assembled as a primary connector 200 (shown in FIG. 4) suitable for being mounted to the panel. The insulating housing 3 of the primary connector 200 is suitable for panel mounting. For example, in connection with FIG. 7 and FIG. 8, the insulating housing 3 has external threads 31, and may be mounted to the panel 910 by means of a mating locknut 1. For a photovoltaic inverting device in the photovoltaic system, if the primary connector 200 is to be mounted to the device case of the photovoltaic inverting device, a certain surface of the device case is to be the mounting panel for the primary connector 200. In this sense, the primary connector may also be referred to as a board-side or device-side connector.

Figure 4:
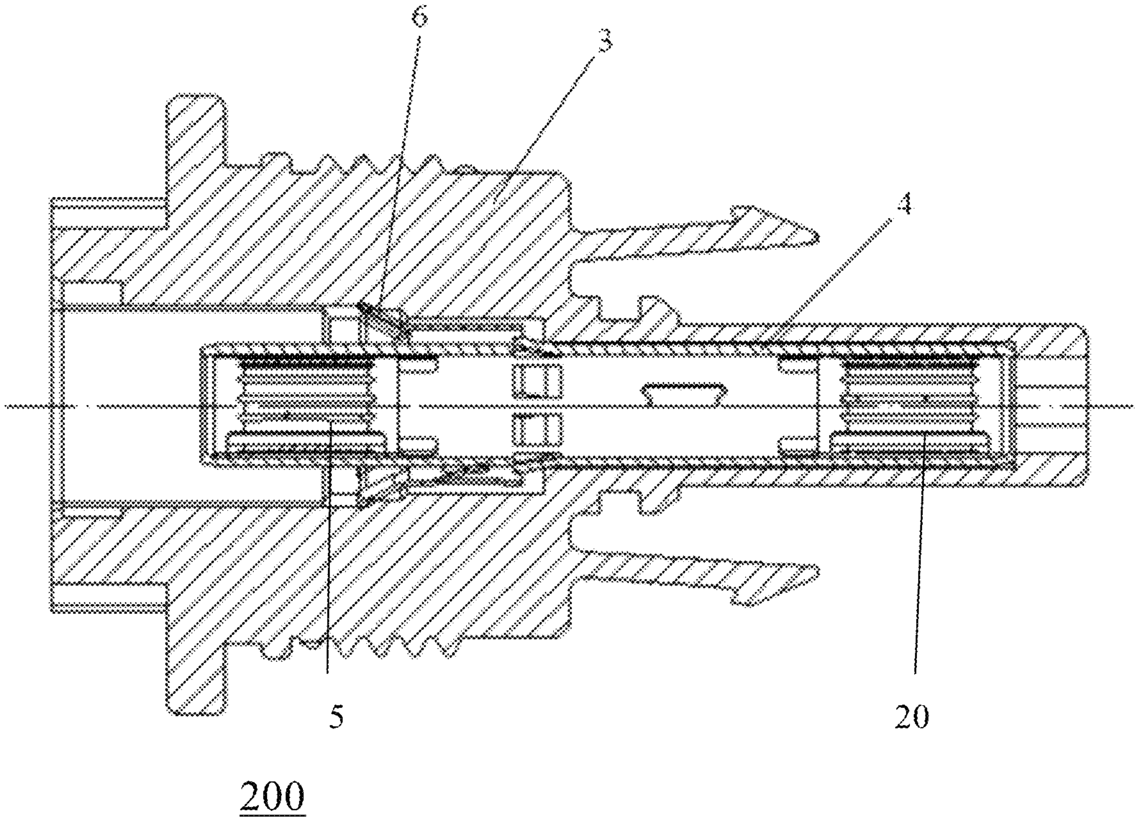
FIG. 4 illustrates a cross-sectional view of an assembly of insulating housing and conductive sleeve of the terminal connection structure according to an example of the present disclosure.
Figure 5:
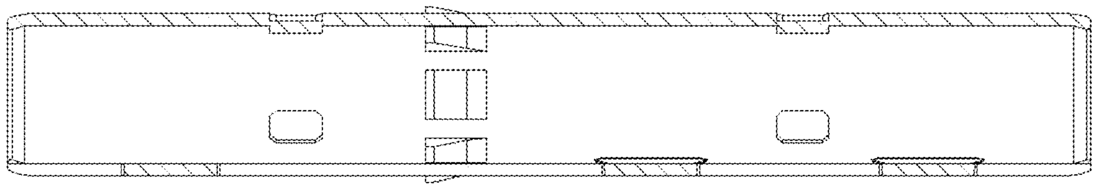
FIG. 5 illustrates a cross-sectional view of the conductive sleeve of the terminal connection structure according to an example of the present disclosure.

As shown in FIG. 4, the insulating housing 3 of the primary connector 200 has a through terminal channel. The conductive sleeve 4, as a primary terminal structure, is inserted into the terminal channel, and the crown spring 5 may be installed into the conductive sleeve 4 at one end of the sleeve.

Figure 1B:
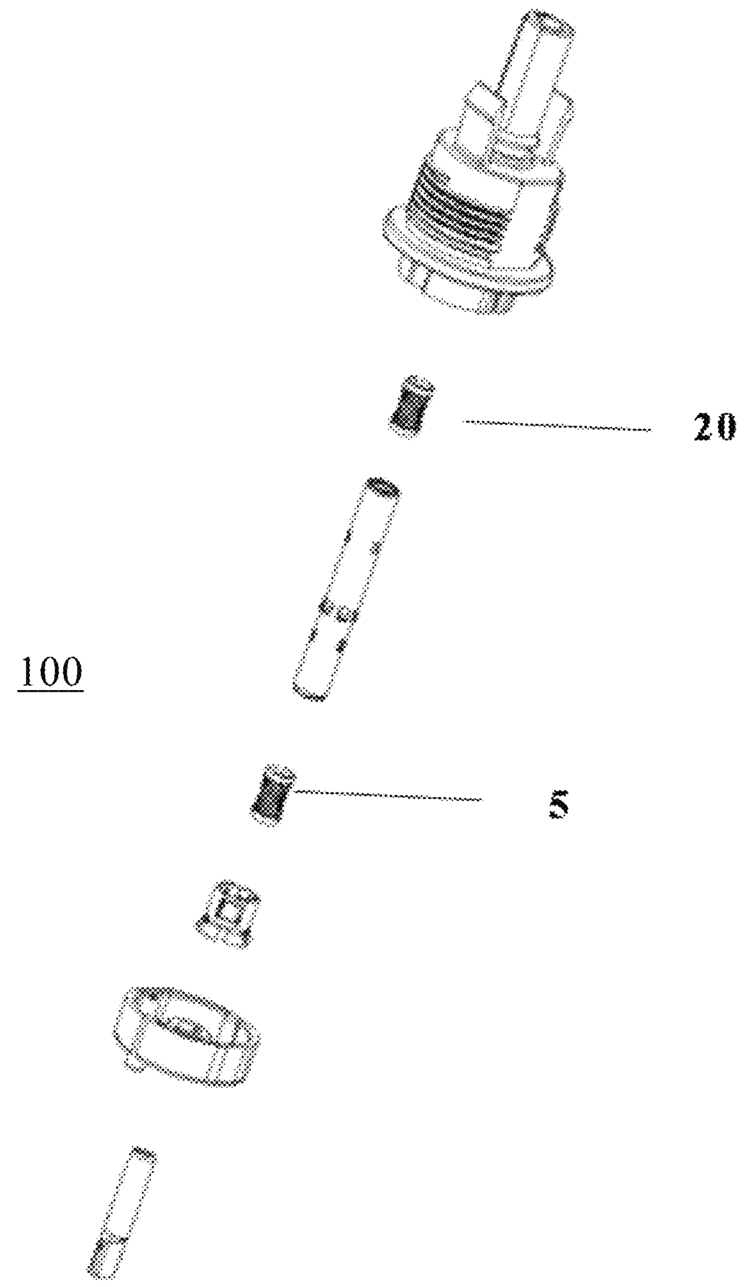

In a further example, as shown in FIG. 4, the other end of the conductive sleeve 4 is also provided with a crown spring 20, so that an electrical connection with the mating terminal may be achieved by crown springs at both ends of the conductive sleeve 4. FIG. 1B correspondingly shows an exploded view including both the crown spring 5 and the crown spring 20. For ease of description, in FIG. 4, the end of the conductive sleeve 4 with the crown spring 5 is referred to as the rear end, and the end of the conductive sleeve 4 with the crown spring 20 is referred to as the front end, in the present application.

Figure 6:
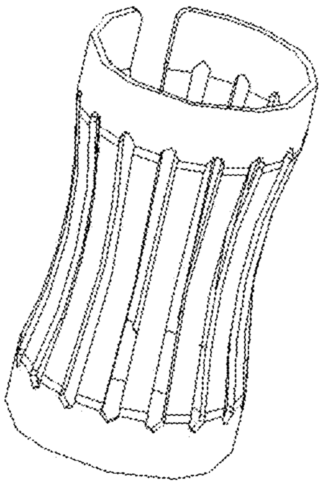
FIG. 6 illustrates a cross-sectional view of a crown spring of the terminal connection structure according to an example of the present disclosure.

The crown spring 5 and/or the crown spring 20 may be, for example, the crown spring as shown in FIG. 6. Alternatively, as another example, the crown spring 5 and/or the crown spring 20 may have the crown spring structure described in CN203423290U. It should be understood that the specific structure of the crown spring does not limit the implementations of the present application.

Figure 2:
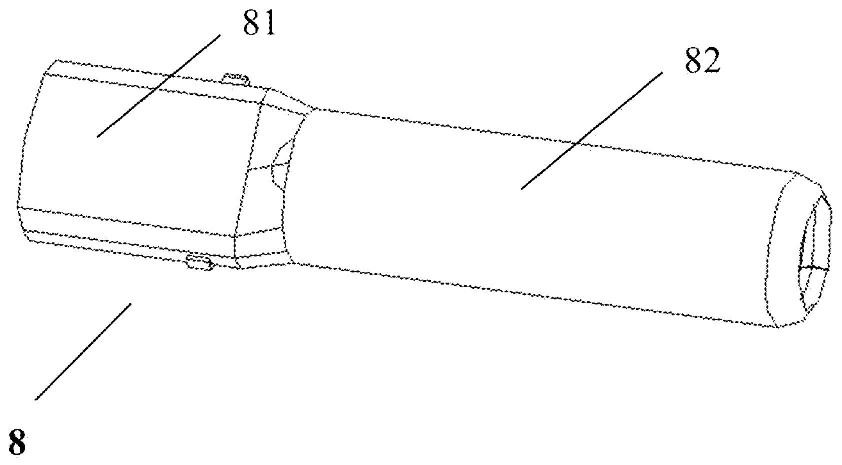
FIG. 2 illustrates a schematic view of a soldering terminal of the terminal connection structure according to an example of the present disclosure.

As shown in FIG. 2, the soldering terminal 8 has a insertion body 82, and further has a soldering tail end 81 for soldering to a board structure such as a PCB. The soldering terminal 8 thus may also be referred to as a lead-out terminal.

Figure 7:
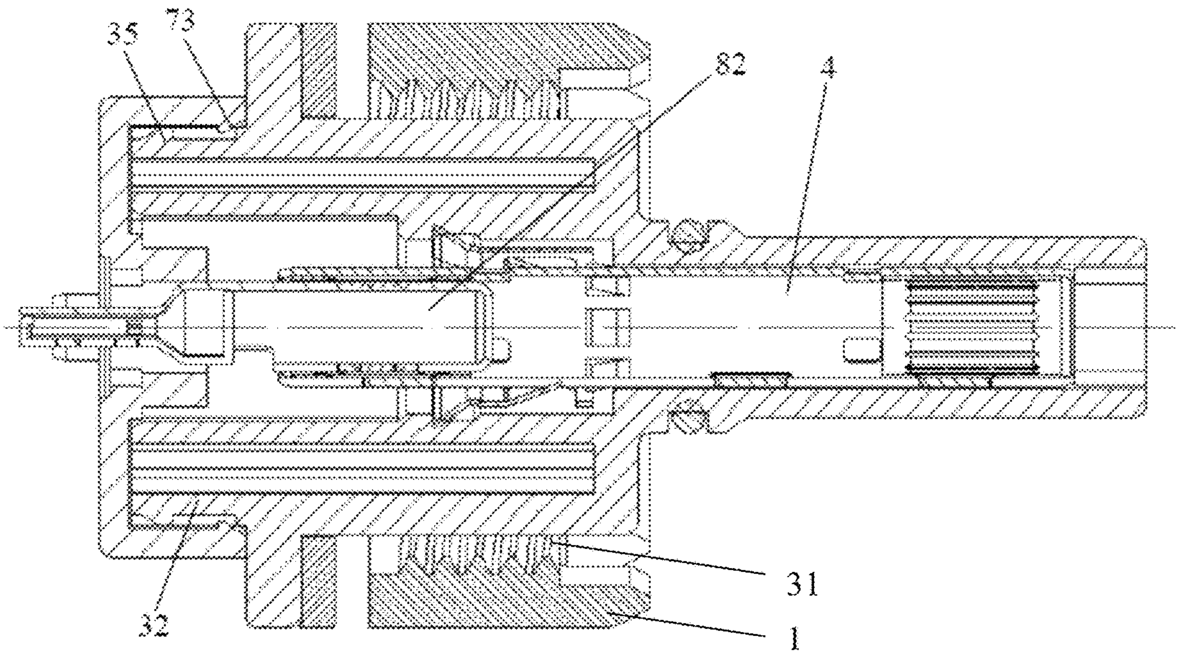
FIG. 7 illustrates a cross-sectional view of an assembly of the soldering terminal and the conductive sleeve in a mated installation state.
Figure 8:
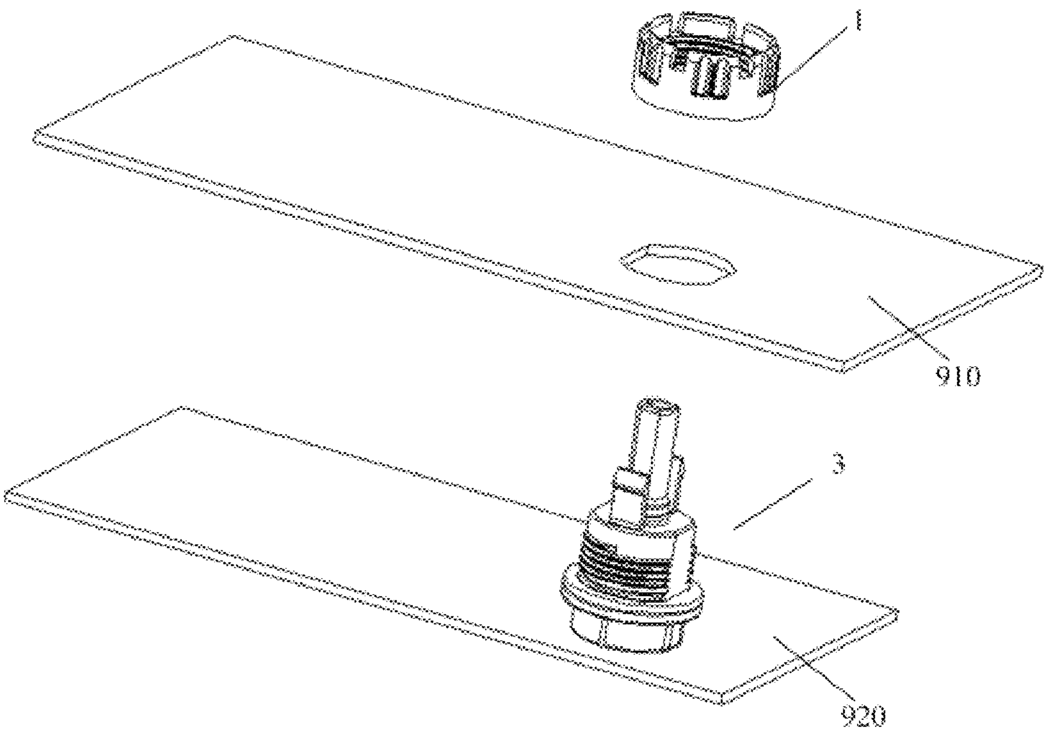
FIG. 8 illustrates a schematic view of the insulating housing of the terminal connection structure being mounted to a panel according to an example of the present disclosure.

With reference to FIG. 4 and FIG. 7, the primary connector 200 includes the conductive sleeve 4 installed in the terminal channel of the insulating housing 3. The rear end of the conductive sleeve 4 is to be used for mating connection with the insertion body 82 of the soldering terminal 8, and the front end of the conductive sleeve 4 is to be used for connection with a terminal of a mating connector (not shown). The rear end of the conductive sleeve 4 may be provided with an elastic coupling member, such as the crown spring 5, for establishing a slidable electrical connection between the inner wall of the conductive sleeve 4 and the insertion body 82 of the soldering terminal 8 when inserted into the sleeve. One skilled in the art can understand that the elastic coupling member inside the conductive sleeve 4 alternatively may be a claw, a leaf spring, a torsion spring, or a wire spring, etc. In addition, similar to the crown spring 5, the crown spring 20 provided at the front end of the conductive sleeve 4 may also be an elastic coupling member in other forms such as a claw, a leaf spring, a torsion spring, or a wire spring, etc.

Figure 9A:
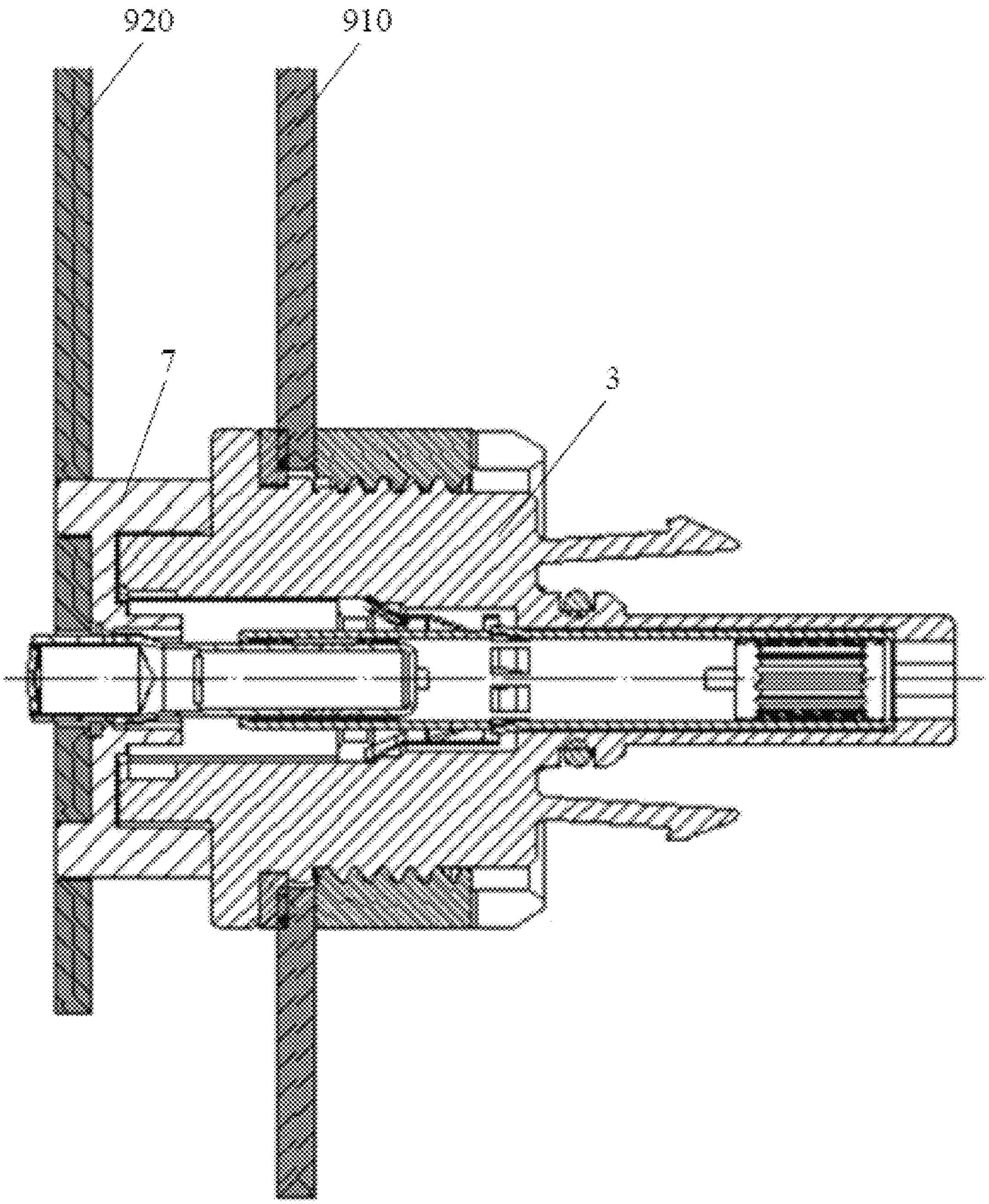
FIG. 9A and FIG. 9B illustrate mounting of the terminal connection structure according to an example of the present disclosure, with different spacings between a PCB and a mounting panel.
Figure 9B:
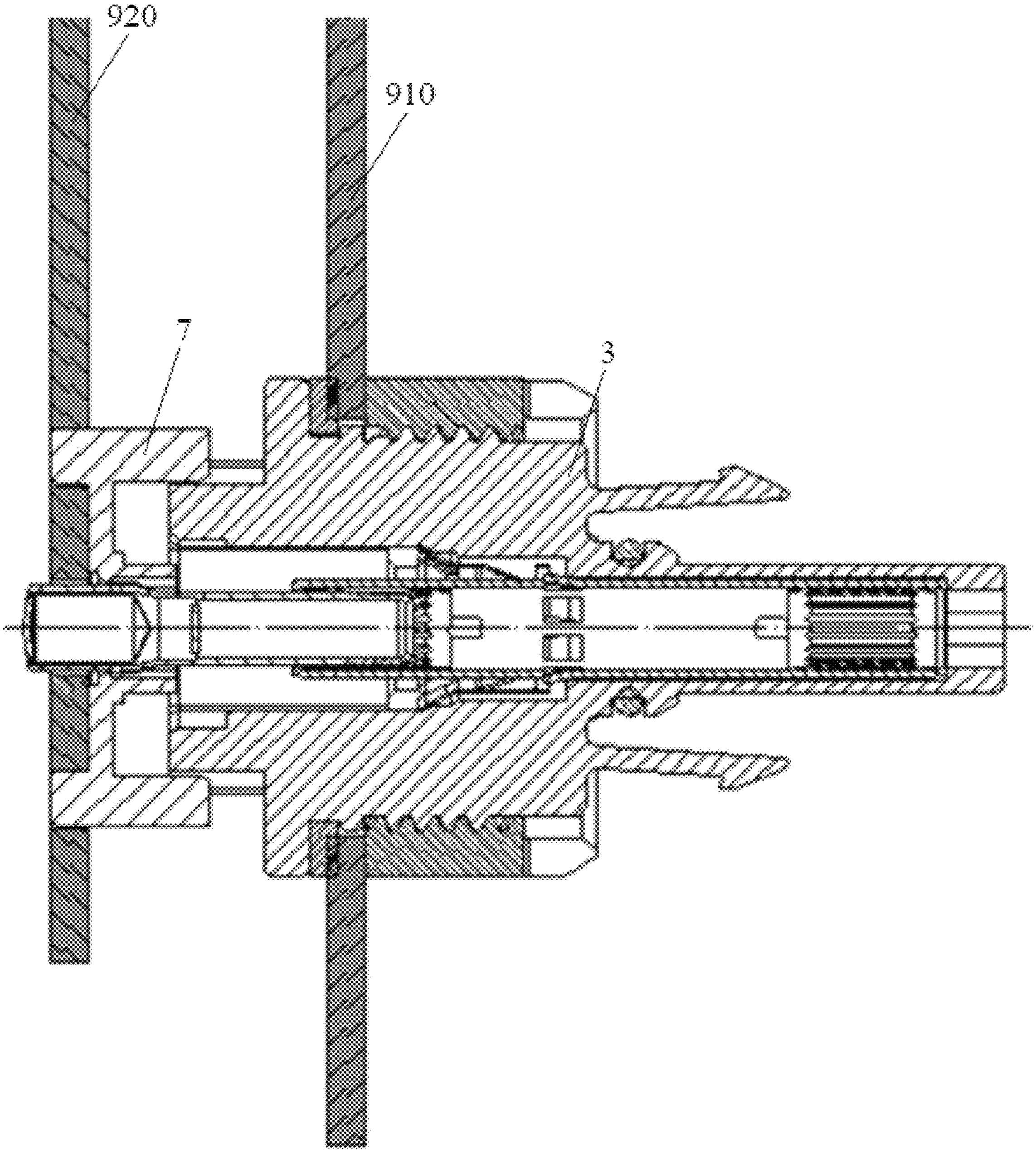
Figure 10A:
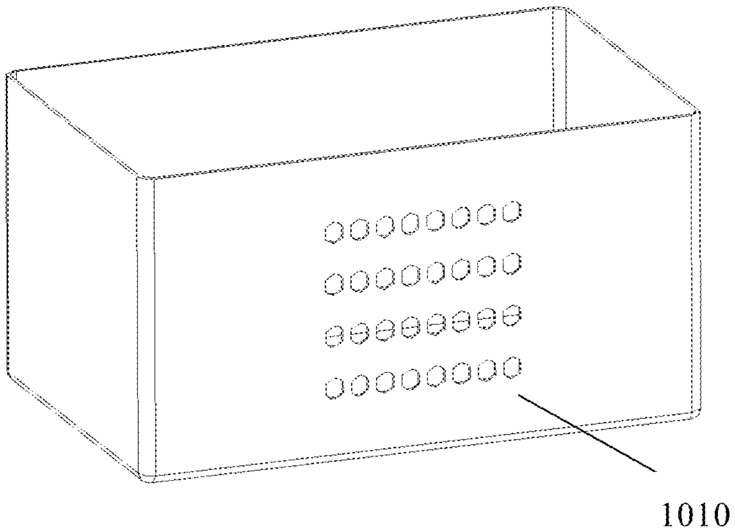
FIGS. 10A-10C illustrate schematic views of connectors mounted to the device panel and establishing an electrical connection with the PCB in the device.
Figure 10B:
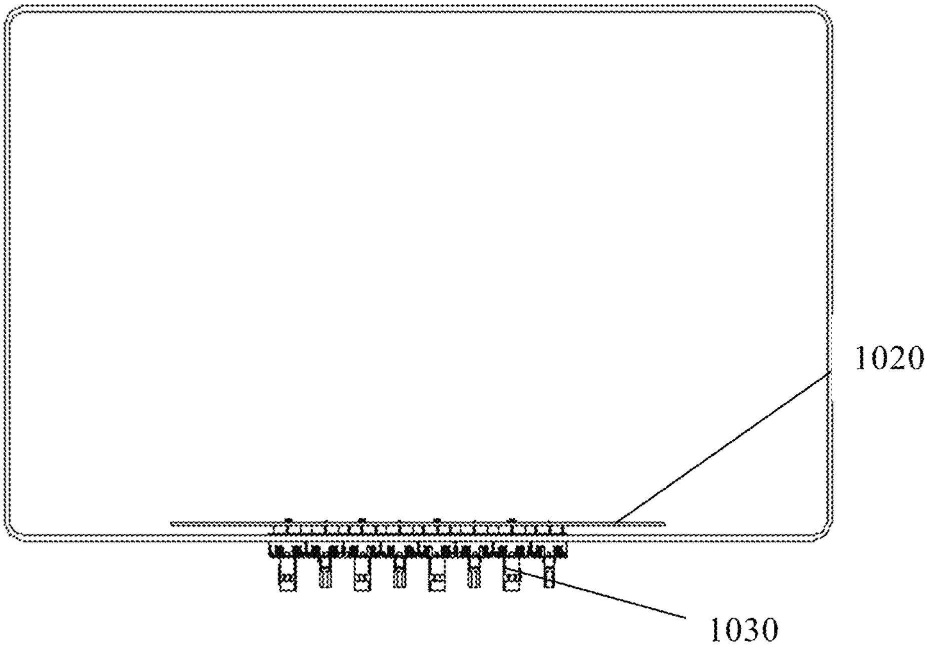
Figure 10C:
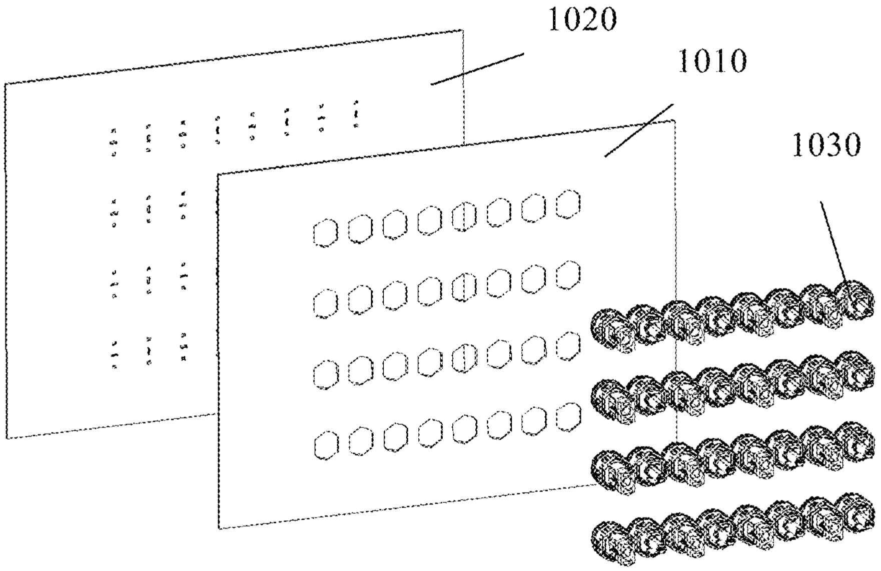

FIG. 9A and FIG. 9B show schematic views of mounting of the terminal connection structure 100 according to an example of the present disclosure, with different spacings. As shown, the insulating housing 3 of the primary connector 200 of the terminal connection structure 100 is mounted to the mounting panel 910 partly by means of a locknut, and the soldering terminal 8 of the terminal connection structure 100 is fixed to the PCB 920 by soldering. By comparing the spacings between the PCB 920 and the mounting panel 910 in FIG. 9A and FIG. 9B, it can be seen that in FIG. 9B the spacing is larger. Since the insertion body 82 of the soldering terminal 8 can slide in the conductive sleeve 4, the terminal connection structure 100 may accommodate different spacing between the mounting panel 910 and the PCB 920, enabling an axial flexible connection without transmitting the pulling force to the solder joint of the soldering terminal 8 on the PCB 920.

Figure 3:
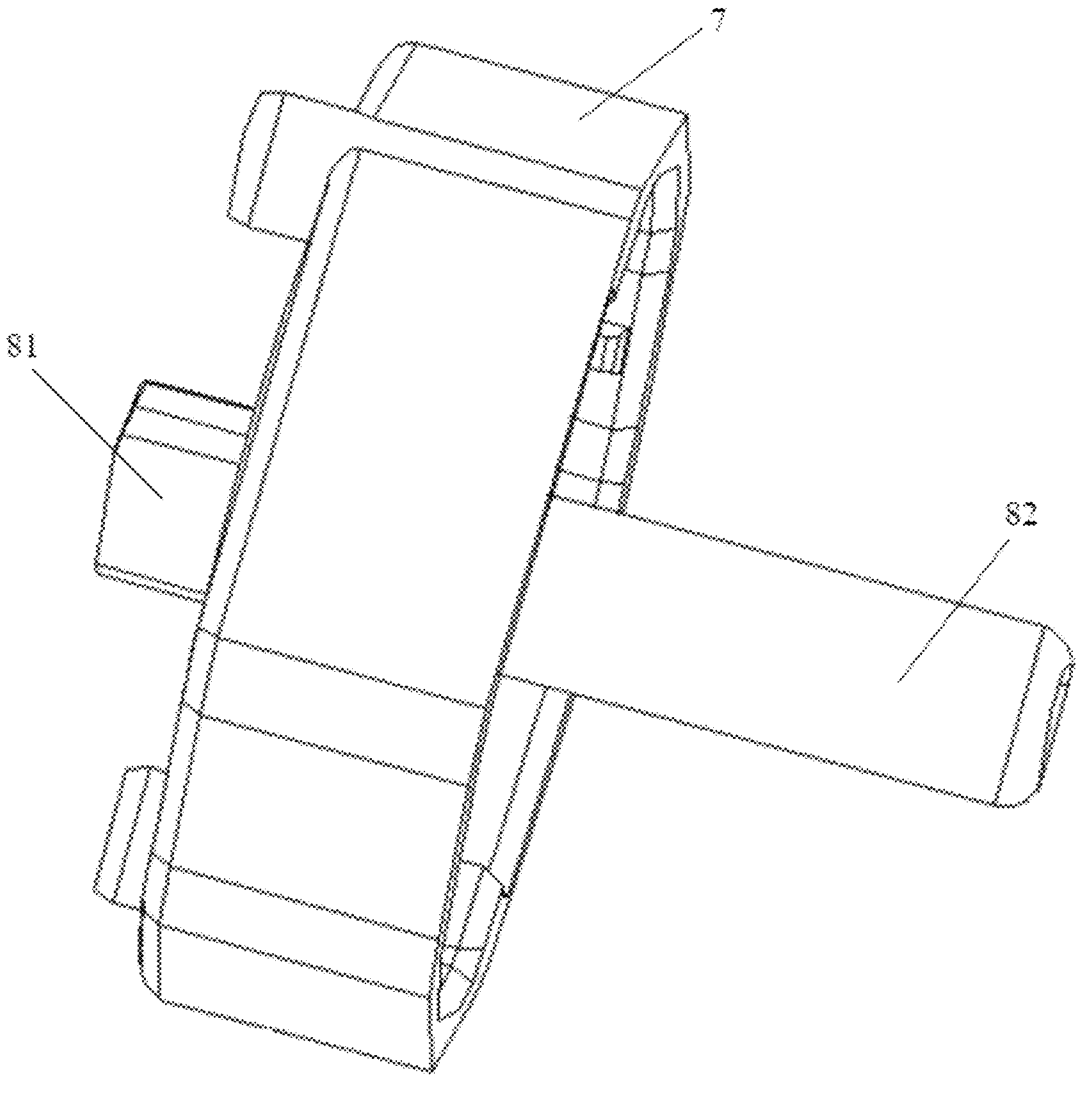
FIG. 3 illustrates a schematic view of an assembly of cover and soldering terminal in the terminal connection structure according to an example of the present disclosure.

The fixing/connection between the soldering terminal 8 and the PCB 920 does not limit the above examples of the present application. For example, in an application scenario, the terminal connection structure 100 may comprise a cover 7, and the soldering terminal 8 may be assembled with the cover 7 to form a soldering terminal assembly as shown in FIG. 3. The soldering terminal assembly may be used to assist in positioning the soldering terminal 8 on the PCB, and may provide insulation between adjacent soldering terminals 8. In the schematic views of FIG. 9A and FIG. 9B, the soldering terminal assembly illustrated in FIG. 3 is shown.

In other implementations, the conductive component in the terminal channel of the insulating housing 3 is not limited to the conductive sleeve 4, and may be other forms of primary terminal structure, as long as the primary terminal structure is used to establish an electrical connection running through the terminal channel, and an elastic coupling member is adopted at the end to be plugged with the soldering terminal.

In other implementations, the board used for soldering and fixing the soldering terminal 8 is not limited to the PCB 920, but may be various other forms of a circuit board carrying electrical circuits.

In the above examples, the soldering terminal 8 shown in FIG. 2 is used as an example of soldering terminals, though it can be understood that other forms of a terminal with a soldering tail end are also possible.

In the above examples, the retaining ring 6 is illustrated, though it can be understood that the use of the retaining ring and the specific form it takes do not limit the present disclosure.

The foregoing has described the basic concepts. Apparently, for one skilled in the art, the above disclosure is only an example and does not limit the present application. Although not explicitly stated herein, one skilled in the art may make various modifications, improvements, and amendments to the present application. Such modifications, improvements, and amendments are proposed in the present application, so these modifications, improvements, and amendments still fall within the spirit and scope of the examples of the present application.

What is claimed is:

1. A terminal connection structure, comprising:
- an insulating housing configured to be mounted to a panel, the insulating housing comprising a through terminal channel;
- a primary terminal structure disposed in the terminal channel, the primary terminal structure configured to establish an electrical connection running through the terminal channel; and
- a soldering terminal comprising a first end and a second end, wherein the first end of the soldering terminal is configured to be soldered to a circuit board spaced apart from the panel, and wherein the second end of the soldering terminal is configured to be plugged into the primary terminal structure;
- wherein a first end of the primary terminal structure comprises a first elastic coupling member configured to establish a first slidable electrical connection with the soldering terminal; and
- wherein a second end of the primary terminal structure comprises a second elastic coupling member configured to establish a second slidable electrical connection with an insertion terminal in a mating connector.

2. The terminal connection structure according to claim 1, wherein the first elastic coupling member is a first crown spring.

3. The terminal connection structure according to claim 1, wherein the first elastic coupling member is a first crown spring, and wherein the second elastic coupling member is a second crown spring.

4. The terminal connection structure according to claim 3, wherein the electrical connection running through the terminal channel is a first electrical connection wherein the primary terminal structure comprises a conductive sleeve, wherein the first crown spring is configured to establish a second electrical connection with an inner wall of the conductive sleeve, and wherein the first crown spring is configured to establish a second slidable electrical connection with an insertion body of the soldering terminal inserted into the sleeve.

5. The terminal connection structure according to claim 4, wherein,
- the primary terminal structure comprises a conductive sleeve,
- the soldering terminal comprises a soldering tail end at a first end and an insertion body at a second end,
- the electrical connection running through the terminal channel is a first electrical connection,
- the first crown spring is configured to establish a second electrical connection with an inner wall of the conductive sleeve and configured to establish a third slidable electrical connection with the insertion body of the soldering terminal inserted into the sleeve, and
- the second crown spring is configured to establish a third electrical connection with the inner wall of the conductive sleeve and configured to establish a fourth slidable electrical connection with the insertion terminal in the mating connector.

6. The terminal connection structure according to claim 1, wherein the panel is a casing panel of an electrical device, and wherein the circuit board is a printed circuit board (PCB) positioned at an inner side of the panel of the electrical device and spaced apart from the panel of the electrical device.

7. The terminal connection structure according to claim 1, further comprising a cover configured for mating installation with a soldering terminal insertion end of the insulating housing, wherein the soldering terminal is configured to be inserted and positioned in the cover.

8. The terminal connection structure according to claim 1, wherein the first elastic coupling member is one of a crown spring, a torsion spring, a wire spring, a claw, or a leaf spring.

9. The terminal connection structure according to claim 1, wherein the second elastic coupling member is one of a crown spring, a torsion spring, a wire spring, a claw, or a leaf spring.

* * * * *